Jan. 19, 1960     A. G. BILLIN     2,922,046

RECIPROCATING BUCKY DIAPHRAGM

Filed Dec. 22, 1955     3 Sheets-Sheet 1

INVENTOR.
Arthur G. Billin.
BY
Wood, Herron & Evans
ATTORNEYS.

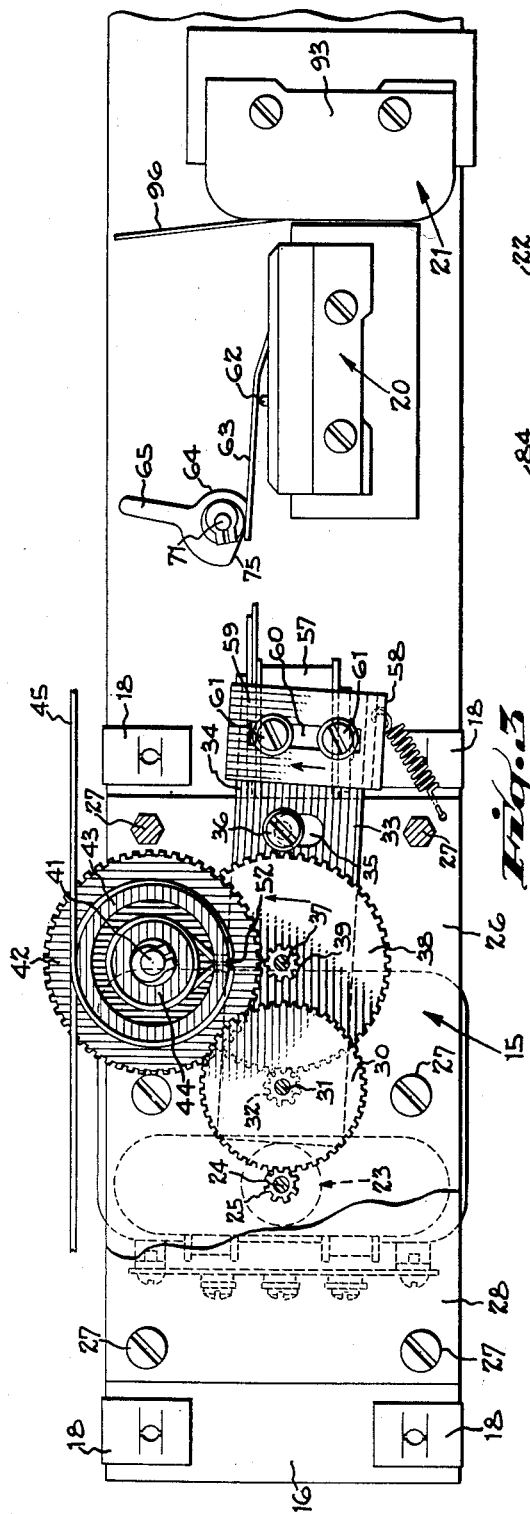

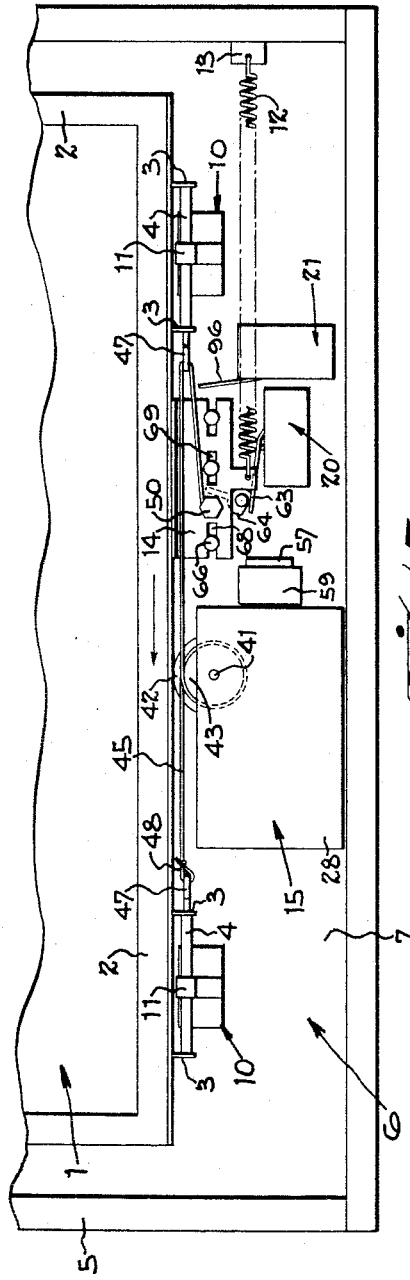

United States Patent Office 2,922,046
Patented Jan. 19, 1960

2,922,046

RECIPROCATING BUCKY DIAPHRAGM

Arthur G. Billin, Cincinnati, Ohio, assignor, by mesne assignments, to Liebel-Flarsheim Company, Rochester, N.Y., a corporation of Delaware Application December 22, 1955, Serial No. 554,730

7 Claims. (Cl. 250—62)

This invention relates to apparatus for producing X-ray photographs. It is directed particularly to an improved mechanism for actuating a Bucky diaphragm of the type conventionally employed to screen secondary radiations from a photographic film or plate in X-ray photography.

In my co-pending U.S. patent application Serial No. 272,658, filed February 20, 1952, now U.S. Patent No. 2,733,352 entitled "Reciprocating Bucky Actuator," of which this a continuation-in-part, a mechanism is disclosed in which a Bucky diaphragm is driven in opposite directions from a reversible electric motor through a sheave which moves a string member having its ends connected to the grid. Such mechanism is operated in conjunction with a so-called homing circuit whereby, upon completion of an X-ray exposure, the motor is caused to drive the grid to "home" position, which constitutes a given starting point from which the grid moves at the commencement of a next successixe X-ray exposure. As explained in the aforesaid patent application, if the grid were allowed to rest at some indiscriminate position at the termination of one X-ray exposure, its position might coincide or be very near to a point of reversal in the range of movement of the grid, whereupon shadows of the opaque strips of the grid might be cast upon the X-ray film in the next successive exposure to such an extent that they would impair its photographic perfection. Through the operation of the homing circuit, the grid is started from a predetermined point just prior to commencement of each X-ray exposure, and this possibility is eliminated.

In modern repetitive X-ray photographic techniques, exposures are made at brief, successive intervals, each photograph thereby indicating any change which may have occurred in the subject over the short interval of time following the preceding photograph; for example, it is not uncommon for X-ray photographs to be taken at intervals of two or three seconds. Since the motor in the apparatus shown in the aforesaid U.S. patent application drives the grid during homing movement thereof at a rate which is inherently the same as the rate at which the motor drives the grid during an exposure, and since the latter rate must be relatively low in order to obtain the desired photographic quality, the time required for the grid to be returned to home position limits the rate at which successive exposures may be made.

A principal objective of this invention, therefore, has been to provide a mechanism for actuating a Bucky diaphragm in which the diaphragm is reciprocated in opposite directions at appropriate speeds during an exposure but is returned very rapidly to home position immediately after an exposure such that all of the advantages which heretofore have been available by virtue of the homing feature may be employed in high-speed, repetitive X-ray photography techniques.

In accordance with this invention, a reversible electric power unit, such as a reversible electric motor, is utilized for actuating the Bucky diaphragm in back and forth directions during X-ray exposure. This may be accomplished as is disclosed in the aforesaid U.S. patent application or in other suitable manner. However, in accordance with this invention, a spring or other device operable independently of the motor is utilized for biasing the Bucky diaphragm to home position at a rapid rate, and means additionally is provided for uncoupling the motor from the diaphragm at the end of an X-ray exposure such that the independent spring means acts immediately to return the diaphragm to home or starting position free from influence or inertia of the motor unit. In the preferred construction, spring or independent biasing means is connected to the diaphragm in such manner that it is always ready to perform its function whenever the X-ray exposure is terminated, regardless of the position the diaphragm happens to occupy in its range of reciprocation at such time. The motor, therefore, operates against the bias of the spring when driving the diaphragm in one direction and with the bias of the spring in the opposite direction. Paradoxically, it has been discovered that a spring strong enough to move the relatively heavy diaphragm at a satisfactory high speed to home position upon declutching of the motor does not influence the speed of movement of the diaphragm under motor operation sufficiently to introduce problems of synchronization such as might otherwise be expected. The present apparatus, therefore, in a simple but reliable manner provides for movement of the diaphragm from home position just prior to commencement of an X-ray exposure, and during the exposure through one or more reversals of direction or less, depending upon the duration of exposure, and also provides for return movement of the diaphragm to starting position promptly after termination of the exposure at a speed fully satisfying the requirements of advanced high-speed repetitive X-ray photography.

Apparatus embodying the foregoing principles of the present invention and other features is illustrated in the accompanying drawings which are described in the following specification.

In the drawings:

Figure 3 is a view similar to Figure 1 showing on an enlarged scale the clutch and reversing switch mechanism;

Figures 4, 5 and 6 are views showing the reversing switch control members in various operating positions;

Figures 7 and 8 are diagrammatic views showing the diaphragm in several operating positions and also showing corresponding relationship of the parts; and Figure 9 is a circuit diagram for a reversible drive motor and clutch control device.

Figure 1:
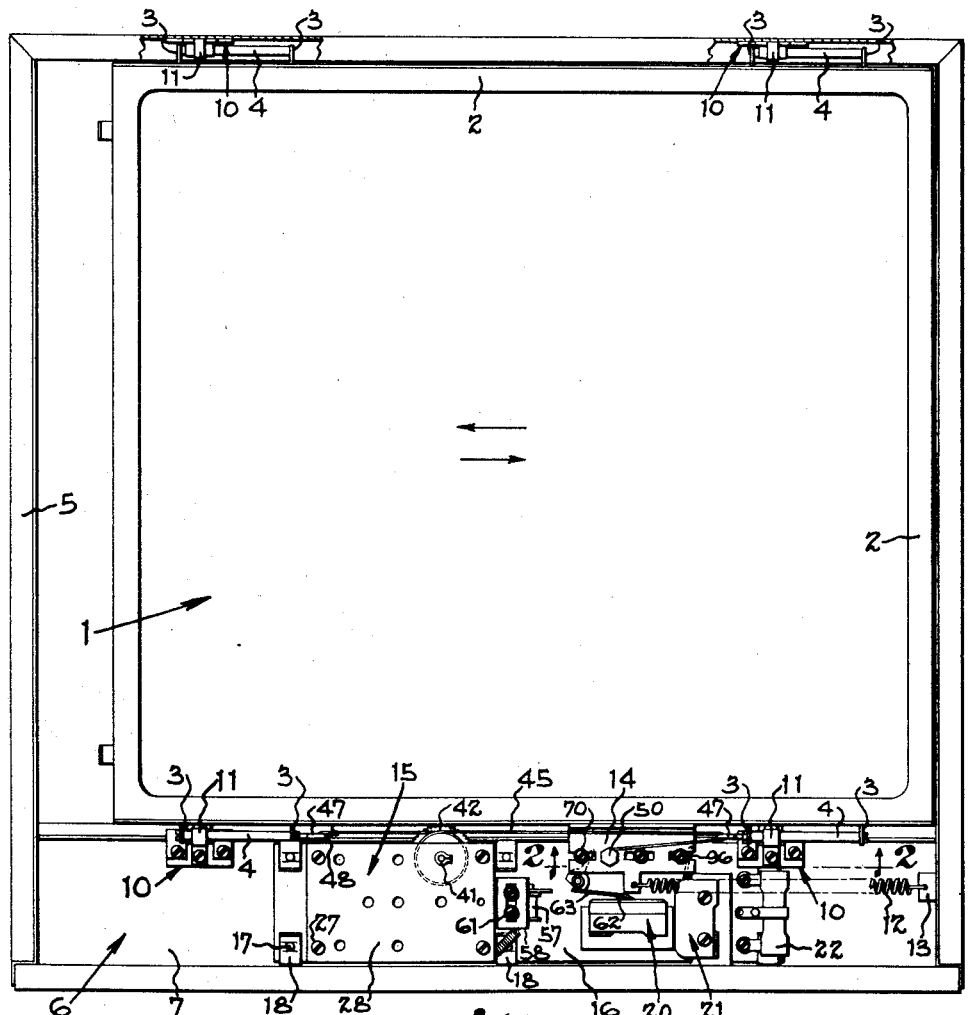
Figure 1 is a plan view of a diaphragm-actuating mechanism for the present invention.

The diaphragm which is actuated by the mechanism of the present invention may be of any suitable type and is indicated generally in the drawings at 1. As will be understood by those skilled in the art, the diaphragm, sometimes known as a Bucky diaphragm, comprises alternate strips respectively opaque and translucent to X-ray radiations emanating from an X-ray tube, but the strips are angulated so as to allow direct radiations from the tube to pass through the grid while screening secondary radiations therefrom which would otherwise obscure the photograph of the subject.

The diaphragm or grid per se is bound within a peripheral frame 2, along opposed longitudinal edges of which are mounted spaced pairs of laterally projecting ears 3, 3. Each pair of ears mounts a guide rod 4 and all of the guide rods extend in parallel with one another. The diaphragm 1 is positioned for movement within an over-all frame or housing 5, which is made up, for example, of plates or channel irons of suitable configuration pinned together by bolts or spot welding.

As will be noted from Figure 1, the frame 5 is both longer and wider than the diaphragm 1. The additional length provides a field of movement for the diaphragm in back and forth directions, as shown by the arrows, while the additional width provides a space indicated generally at 6 along one side of the diaphragm within which components of the actuating and controlling mechanism are housed. The frame 5 at the area 6 is equipped with a bottom wall 7.

Diaphragm 1 is mounted for sliding movement in the frame 5 by means of brackets indicated generally at 10 carrying blocks 11 which are bored to receive the guide rods 4. The brackets 10 in the area 6 are mounted upon the bottom wall 7, while those at the opposite side of the diaphragm may be suitably fastened to the adjacent wall of the frame 5.

Diaphragm 1 is biased toward abutting engagement with the frame 5 along one sidewise edge thereof, or against other suitable stop means, by a tension spring 12. One end of the spring is fastened to a bracket 13 mounted on the side edge of frame 5, while the opposite end of the spring is fastened to bracket plate 14 which is fastened to and projects from a longitudinal edge of the diaphragm frame 2. The position in which the diaphragm is in abutment with the frame 5 or other suitable stop means under the influence of the spring 12, which position is shown in Figure 1, is hereinafter referred to as a rest or home position to which it is desired to return the diaphragm after each X-ray exposure, as heretofore explained.

For reasons understood by those skilled in the art, it is requisite to move the diaphragm during an X-ray exposure; if it were stationary, the opaque grid strips of the diaphragm would cast their shadows upon the X-ray photograph and thereby render it obscure. Therefore, the diaphragm, in accordance with the present invention, moves from its home position through one or more excursions within a range of movement spaced from the home or rest position. Since the range of such movement inherently is limited, provision is made to maintain diaphragm movement by shuttling or reciprocating it in back and forth directions so long as exposure continues.

The actuating mechanism exployed for this purpose comprises a motor mechanism indicated generally at 15 which is mounted, as a unitary assembly, upon a plate 16 in the area 6 of the frame. Plate 16 is fastened to the bottom frame member 7 by means of screws 17 which reside in threaded engagement with speed nuts 18, the plate 16 being spaced from the bottom plate 7 by means of washers 19. Plate 16 also carries a reversing switch indicated generally at 20, an X-ray exposure control switch indicated generally at 21, and an adjustable resistor 22, all of which are subsequently explained, or such other devices as may be necessary or desirable to employ for motor control purposes, depending upon the particular control circuit chosen for use.

The drive motor 23 may be of the conventional alternating current, synchronous type, or pole shading or other suitable type, having reversing windings. Since the details of the motor form no part of the present invention, they are shown only in dotted lines in Figure 3. It is to be noted, however, that the armature shaft 24 of the motor, as shown in Figure 3, carries a drive pinion 25 which is journaled in a mounting plate 26 at the opposite side of which the motor 23 is located. Thus, in the preferred construction the electric motor proper is fastened to plate 16 beneath the mounting plate 26 which, in turn, is supported on corner posts 27 projecting upwardly from plate 16. Posts 27 also support a second mounting plate 28 spaced upwardly above the mounting plate 26 in parallel therewith.

Pinion 25 driven by motor 23 is in mesh with a gear 30 which is rotatably mounted upon an axle 31 staked on or fastened to plate 26. Axle 31 also carries a pinion 32 which is rotatable in unison with gear 30. A clutch plate 33 is pivotally mounted on axle 31, the clutch plate residing facially adjacent plate 26 and extending outwardly beyond its edge as at 34. Clutch plate 33 is slotted as at 35, and a stop screw 36 passes through the slot into threaded engagement with plate 26 to limit clutch plate swing about the axis of shaft 31.

Clutch plate 33 rigidly carries an axle 37 upon which is rotatably mounted a gear wheel 38 in mesh with pinion 32. Axle 38 also carries a pinion 39 which is rotatable in unison with gear 38.

Along the edge of the motor assembly 15, adjacent the longitudinal edge of the diaphragm 1, an axle 41 is mounted between plates 26 and 28. This axle carries a gear wheel 42 having an annular ring portion 43 concentric therewith which serves as a drive sheave. The sheave portion 43 surrounds and is integral with, but spaced from, a hub portion 44, and the entire gear wheel and sheave unit is rotatable freely about the axle 41, or, alternatively, the axle 41 is rotatable freely in its bearings in plates 26 or 28. Normally, therefore, when the clutch plate 33 is in the down position, pinion 39 is spaced from the teeth of gear wheel 42, and there is no driving connection between the two. This is the position in which the parts are shown in Figure 3. However, by swinging clutch plate 34 about the axis of shaft 31, in the direction shown by the arrow in Figure 3, the teeth of pinion 39 may be brought into meshing engagement with the teeth of gear wheel 42, whereby a driving connection is established between the motor pinion 25 and the drive sheave 43 through the train of gears whereby appropriate speed reduction is obtained. The teeth of the pinion 39 and the gear wheel 42 are of fine pitch so as to mesh readily without clashing whenever the clutch plate is operated to the driving position.

Motion from the motor 23 is imparted to the diaphragm 1 through the clutch mechanism just described by means of a string 45 which is snubbed, wrapped, or suitably fastened to the sheave 43 and has its opposite ends connected to the diaphragm 1. For this purpose, in the construction shown, the endwise portions of the guide rods 4 are bored and threaded to receive eyes 47. String 45 is tied to one of the eyes as at 48 (Figure 1), and passes therefrom around the drive sheave 43, thence through the other eye 47, and back to a binding post 50 which is adjustably mounted on plate 14. In the preferred construction, the annular sheave 43 is cross-bored as at 52, and a positive connection of the string to the sheave is provided by forming a loop in the string 45, passing the loop through the bore 52 and around the hub 44, then drawing the string tightly around the hub whereby a frictional purchase of the string upon the sheave is provided which prevents relative slippage between the string and sheave.

Figure 2:
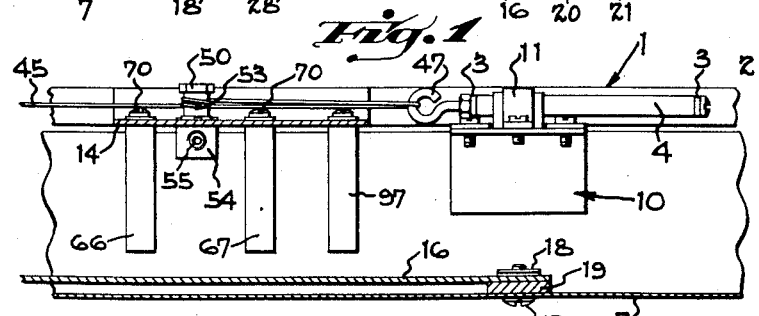
Figure 2 is a fragmentary sectional elevation taken on the line 2—2 of Figure 1.

To adjust string tautness, binding post 50 may be cross-bored as at 53 (Figure 2), and the free end of the string may be passed through the cross bore after being wrapped around the binding post once or several times. The binding post is rotatably mounted on plate 14 by means of a depending shank which projects into a collar 54 fastened rigidly to the lower end of the plate 14, and the collar 54 carries a lock screw 55. Therefore, by rotating the binding post in suitable direction, the drive string may be drawn taut, after which the lock screw 55 may be tightened. These or other suitable adjustments are employed to provide for take-up in the tension of the string should it stretch slightly during usage.

The string member 45 may be fabricated of nylon cord, flexible metal cable, or other material which is sufficiently flexible to pass freely around the sheave when driven thereby, and should be sufficiently strong to withstand the tension loads imposed upon it when the relatively heavy diaphragm is reciprocated without yielding elastically to any substantial degree.

It will be seen from the construction described up to this point that swinging movement of the clutch plate 33 toward the gear wheel 42 brings the teeth thereof into mating engagement, thereby powering the drive sheave from the motor, while swinging movement of the clutch plate in an opposite direction promptly releases the drive sheave from the motor and gear train and permits the diaphragm to be moved by the spring 12 toward the rest position no matter what its position may have been at the moment of declutching. The clutch preferably is actuated electrically so that declutching is effected immediately upon termination of an exposure whereby the diaphragm thereupon may be returned to home position with the least delay or in the shortest time.

One suitable arrangement for controlling the clutch to accomplish this result employs a solenoid 57 which is mounted upon a bracket extending from plate 7 beneath the portion 34 of the clutch plate 33 which projects beyond plates 26 and 28. The solenoid cooperates with an armature 58 which is magnetically responsive thereto. The armature may be in the form of an angle piece having an arm portion 59 which resides against the face of clutch arm 33. Arm portion 59 is slotted as at 60, and screws 61 pass through the slot into threaded engagement with the clutch plate 33, thereby permitting adjustment of the armature 58 with respect to the solenoid core. These parts are preferably so arranged that the armature engages the solenoid core when pinion 39 is in full mesh with sheave gear 42, but movement of the armature in the opposite direction, that is, away from the solenoid, is limited by engagement of an end of slot 35 with stop screw 36 such that the armature, even in declutching position of the clutch plate 33, is still magnetically responsive to the solenoid upon energization thereof. The clutch plate 33 is biased to declutching position either by its own weight or by means of a spring connected thereto from plate 26.

Reversal in the direction of rotation of motor 23, as required to reciprocate the diaphragm during long exposures, is provided through the actuation of reversing switch 20. This unit may be of the single pole, double throw micro-switch type and has an actuating button 62 which is served by a slightly yieldable arm 63. The arm 63 is operated by a cam 64 having a lever 65 which is responsive to dogs 66 and 67 carried by the diaphragm so as to be movable in unison therewith. In the construction shown, plate 14 is slotted as at 68 and 69. Dogs 66 and 67 are fastened to the plate 14 by means of screws 70 which pass through the respective slots 68 and 69, the slots thereby providing adjustability as to the dog posts. Cam 64 is journaled on a stud 71 projecting from plate 16 in such position that the cam arm 65 resides between the dog posts 66 and 67 and is engageable with either depending upon the direction of movement of the diaphragm. Cam 64 comprises faces 75 and 76 which are arranged angularly with respect to one another for alternate engagement with the switch-actuating arm 63, and it will also be noted that the cam faces are slightly eccentric with respect to stud 71. Therefore, the switch 21 is thrown to one position when the lever 65 is engaged by dog 67 and is moved relatively to the left, as shown in Figure 5, while being thrown under its own bias to the other position when the lever 65 is engaged by the other dog 66 and is thrown to the right. To obtain suitable switch sensitivity and still allow a short distance of travel of the diaphragm as it comes to a stop, the parts are so arranged that the switch is actuated to one position when the lever 65 is moved to the position shown in Figure 4, remains in the same position while the diaphragm is moving to the right, as is shown in Figure 5, in which cam face 75 is in full facial engagement with the arm 63, and is not thrown to the opposite position until lever 65 is moved to the opposite position, as shown in Figure 6.

Various electrical circuits may be utilized to interconnect the electrical elements, depending upon the type of reversal motor and the type of clutch actuator which are chosen. Figure 9 shows a circuit arrangement suitable for operation of the elements as illustrated. The motor 23 has an armature 80 which is served by a main field winding 81 and reversing field windings 82 and 83. The pole shading windings 82 and 83 are in common connection with a lead 84 which extends to the variable resistor 22 which is mounted on plate 16 as previously noted, while an adjustable tap 85 on the resistor is connected to one terminal 87 of switch 20. The other contacts 88 and 89 of switch 20 are connected respectively to the field windings 82 and 83. The winding of relay 57 is connected in parallel with the main field winding 81 across input terminals 90 and 91, one of which may contain a primary control switch 92.

From this diagram it will be seen that when the control switch 92 is closed, field winding 81 and relay 57 are energized simultaneously, whereby the motor starts to operate and whereby the clutch is immediately thrown to driving position so that the drive sheave 42 is rotated through the gear train. Since spring 12 has previously pulled the diaphragm to the home position, switch 20 is so arranged that the motor will operate in a direction appropriate to move the diaphragm away from home position. The diaphragm will continue to be moved in the same direction until dog 67 engages lever 65 and throws it to the opposite position, thereby actuating switch 20 so as to open the circuit to field winding 82 and close the circuit of the other field winding 83 whereupon the direction of rotation of the motor will reverse. In this manner, the motor will continue to cause the diaphragm to be reciprocated. It is contemplated, however, that switch 92 will be opened, either manually or automatically, at the termination of an exposure, whereupon field winding 83 and the relay 57 are de-energized and the drive sheave is declutched from the motor. At such an instant, the diaphragm is free to move under the influence of spring 12 and thereby is returned to home position, ready for the next X-ray exposure.

In the apparatus shown in the drawings, an additional switch 93 is mounted upon the plate 16. This switch is in circuit-controlling relation to the X-ray tube through leads 94 and 95 which are connected to a control relay or the like, and switch 93 comprises an actuating arm 96 which is engageable by a dog 97 mounted adjacent the dogs 66 and 67 on the diaphragm bracket plate 14. The switch is normally held in open position by dog 97 when the diaphragm is at the home or rest position such that the X-ray tube is not energized. However, when the diaphragm moves away from rest position after energization of the power motor, the dog 97 moves away from switch arm 96, and the switch under its own bias moves to closed position. This arrangement defers commencement of an X-ray exposure until the diaphragm is in motion. It will be understood that any suitable timer arrangement, either automatic or manual, may be used to de-energize the X-ray tube when exposure is to be terminated.

Since spring 12 is always in connection with the diaphragm, it is apparent that the spring will tend to increase the rate of movement of the diaphragm under motor operation in one direction and retard it in the other, i.e., when the motor is required to operate against spring tension, unless the spring 12 were to be of low strength in which event it would be incapable of moving the diaphragm to home position with the rapidity desired. However, by virtue of the increase in torque which is obtained through the reduction gearing, it has been found possible to use a spring of substantial strength without overloading the motor or without obtaining any substantial difference in speed of movement of the diaphragm whether the motor is pulling against the spring or the spring is pulling with the motor. A strong spring, therefore, permits the diaphragm to be returned to home position after exposure at a relatively high rate of speed, free from the inertial retarding or braking effect which would otherwise be exerted on the sheave if the motor and gear train remained in driving connection between the motor and diaphragm after motor de-energization. The present apparatus, therefore, permits successive exposures to be made at very short time intervals, while returning the diaphragm to a predetermined starting position after each exposure.

Having described my invention, I claim:

1. A diaphragm assembly for screening secondary X-ray radiations from a photographic film, comprising a frame, a screen diaphragm slidably mounted in said frame, a reversible electric motor mounted in said frame, a drive sheave, a two-position clutch for coupling and uncoupling the said drive sheave with said electric motor, a string member in driven engagement with said drive sheave and in driving engagement with said screen diaphragm for effecting linear movements of said screen diaphragm in opposite directions as determined by the direction of rotation of said electric motor, a solenoid for actuating said clutch to a position coupling said motor and said drive sheave, means effective upon de-energization of said solenoid for uncoupling the same, a control circuit including said electric motor and switch members responsive to the movement of said screen diaphragm for reversing the direction of rotation of said motor at predetermined points in the movement of said screen diaphragm member, and means operable independently of said motor, sheave, and clutch and effective immediately upon uncoupling of said clutch for immediately moving said screen diaphragm member at a rate greater than the rate at which said screen diaphragm is driven by said motor to a predetermined starting position.

2. A mechanism for reciprocating a screen grid continuously during an X-ray exposure, comprising a reversible electric motor, means including a string drive connecting said electric motor to said Bucky grid for imparting movements thereto in opposite directions from said motor, reversing switch means in electrical connection with said motor, an actuator for said switch means secured to said grid whereby reversal in the direction of rotation of said electric motor is effected at predetermined points in the movement of said grid, means for initiating and terminating energization of said electric motor, independent means for uncoupling said electric motor from said string drive, and spring means connected at all times between said grid and base, said spring means normally being ineffective to substantially influence the speed of movement of said Bucky grid when the said grid is being driven by said electric motor through said string drive, but the said spring means being effective immediately to move said Bucky grid to a starting position upon uncoupling of said electric motor from said spring drive.

3. A mechanism for actuating a Bucky grid during an X-ray exposure and subsequent thereto, said mechanism comprising a base having a Bucky grid slidably mounted thereon, a reversible electric motor mounted in said base, said electric motor having an output shaft carrying a pinion, a drive sheave rotatably mounted on said base, a string member engaging said drive sheave and having its ends connected to said Bucky grid, a clutch for coupling the electric motor with said drive sheave, said clutch including a movably mounted member having a tumbler gear engageable and disengageable with said pinion upon movement of said member in opposite directions, a solenoid for effecting movement of said member in gear-engaging direction, a spring connected between a fixed point on said base and said Bucky grid for moving said Bucky grid to a given starting position upon uncoupling of said gears, a reversing switch in electrical connection with said motor, means carried by said Bucky grid for actuating said reversing switch whereby said Bucky grid is reciprocated so long as the motor is energized, and the said gears are coupled, after which the said spring immediately moves said grid to said starting position, and means for energizing the said motor and said solenoid.

4. A mechanism for reciprocating a Bucky grid continuously during an X-ray exposure, comprising a base having means for slidably mounting a Bucky grid carried therein, a reversible electric motor unit mounted in said base, the said reversible electric motor unit comprising a drive sheave and a clutch interconnected between said motor unit and said drive sheave, a slightly yieldable string member connecting said drive sheave to said Bucky grid for imparting motor movements in opposite directions to said grid when said sheave is connected to said motor unit through said clutch, reversing switch means in electrical connection with said motor unit, an actuator for said switch, means secured to said grid whereby reversal in the direction of rotation of the said electric motor is effected at predetermined points in the movement of said grid, spring means for moving said grid to a given rest position when said drive sheave is declutched from said motor, a solenoid member for actuating said clutch, and means for energizing said solenoid, the said motor unit being effective to drive said Bucky grid against the bias exerted thereon by said spring means, such that declutching of the drive sheave from the motor through said clutch and solenoid permits the said spring means immediately to move said Bucky grid to the said starting position.

5. A mechanism for actuating a Bucky grid, comprising a base having a Bucky grid slidably mounted thereon for movement in opposite directions, a rotatable drive sheave, a string member interconnecting said drive sheave with said grid for effecting sliding movement of the said grid in opposite directions upon rotation of said drive sheave in opposite directions, a reversible electric motor, a clutch for coupling and uncoupling said electric motor with said drive sheave, a solenoid for actuating said clutch, spring means coupling said grid to said base for moving said grid to a given starting position upon uncoupling of said drive sheave and said motor but ineffective to substantially restrain movement of said Bucky grid under the power furnished to said drive sheave from said motor when the same are coupled, a reversing switch in electrical connection with said motor, an actuator for said reversing switch secured to said grid whereby reversal in the direction of rotation of said electric motor is effected at predetermined points in the movement of said grid, which points are spaced from the said predetermined starting point, and means for controlling energization of said solenoid to effect coupling and uncoupling of said motor and said sheave through said clutch whereby the said grid is moved by said spring to the said predetermined starting position promptly upon uncoupling of said motor from said drive sheave.

6. A mechanism for reciprocating a screen grid continuously during an X-ray exposure, comprising a reversible electric motor, means including a string drive connecting said electric motor to said Bucky grid for imparting movements thereto in opposite directions from said motor, a reversing switch in electrical connection with said motor, actuator means for said switch secured to said grid whereby reversal in the direction of movement of said electric motor is effected at predetermined points in the range of movement of said grid, means for initiating and terminating energization of said electric motor, independent means for uncoupling said electric motor from said string drive, and spring means connected at all times between said grid and base, said spring means normally being ineffective to move said Bucky grid when the said grid is being driven by said electric motor through said string drive, but the said spring means being effective promptly to move said Bucky grid to a starting position immediately upon actuation of said uncoupling means.

7. A Bucky diaphragm mechanism, including a reversible electric motor, means for reversing the direction of rotation of the same, a Bucky diaphragm movable in opposite directions, a clutch for coupling and uncoupling said Bucky diaphragm with said reversible electric motor, a source of electric power for said motor, a solenoid in electrical connection with said source for actuating said clutch to position wherein said electric motor is coupled with said diaphragm, a spring biasing said diaphragm in one direction to a starting position, the said diaphragm when uncoupled from said motor being freely movable under the influence of said spring but the said motor when coupled with said diaphragm being effective to move said diaphragm against the bias of said spring, and a switch in circuit-controlling connection with said power source motor and said solenoid for de-energizing both whereby said spring thereupon immediately moves said diaphragm to said starting position.

References Cited in the file of this patent

UNITED STATES PATENTS

| 2,241,516 | Ledin | May 13, 1941 |
| 2,334,137 | Wagner et al. | Nov. 9, 1943 |
| 2,591,536 | Gieringer | Apr. 1, 1952 |
| 2,733,352 | Billin | Jan. 31, 1956 |
| 2,846,588 | Berger | Aug. 5, 1958 |